March 15, 1966 K. SOBOTTA ETAL 3,241,113

ARRANGEMENT FOR PREVENTING ALTERNATIVE SIGNALLING CONDITIONS, ESPECIALLY IN ROAD TRAFFIC LIGHT SIGNALLING SYSTEMS

Filed Oct. 31, 1961 2 Sheets-Sheet 1

INVENTOR.
Kurt Sobotta
Rudolf Luce

BY

Percy P. Lantzy

Attorney

ARRANGEMENT FOR PREVENTING ALTERNATIVE SIGNALLING CONDITIONS, ESPECIALLY IN ROAD TRAFFIC LIGHT SIGNALLING SYSTEMS

Filed Oct. 31, 1961 2 Sheets-Sheet 2

INVENTOR.
Kurt Sobotta
Rudolf Luce
BY
Percy P. Lantzy
Attorney 3,241,113
Patented Mar. 15, 1966

3,241,113

ARRANGEMENT FOR PREVENTING ALTERNATIVE SIGNALLING CONDITIONS, ESPECIALLY IN ROAD TRAFFIC LIGHT SIGNALLING SYSTEMS

Kurt Sobotta and Rudolf Luce, Ditzingen, Germany, assignors to International Standard Electric Corporation, New York, N.Y., a corporation of Delaware Filed Oct. 31, 1961, Ser. No. 149,020
Claims priority, application Germany, Nov. 4, 1960, St 17,074
20 Claims. (Cl. 340—78)

Figure 1:
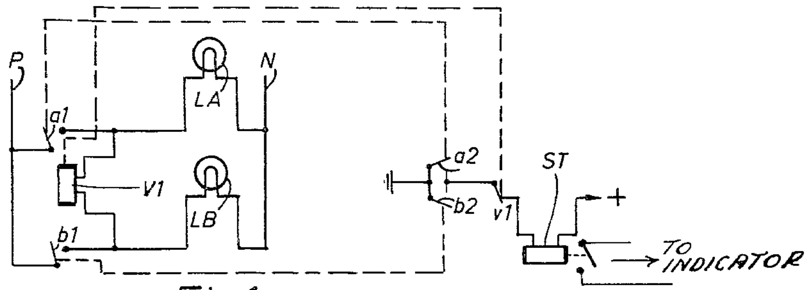

In signalling systems, especially in road traffic light signalling systems, the problem arises of reliably suppressing alternative signalling conditions. Although the program control circuit prevents a situation such as the simultaneous display of green by the signal lights in both directions at an intersection, it is still possible that this condition might be caused by certain disturbances of the system. A serious error of a similar kind may occur if the stop-light signal is not displayed in one direction, while the clear-light signal is displayed in the other. This last mentioned error is avoided in conventional types of system by connecting either a second red-light lamp in parallel, with the first, or by providing the red-light lamp with two filaments. This circuit, however, also requires supervision with respect to possible interruptions.

An arrangement has also been proposed by which a simultaneous display of two alternative signal lights, e.g. of green-light lamps, is supposed to be prevented. In this arrangement each signal lamp is supervised by a relay connected in series therewith. The contacts of the supervisory relays of light signals, whose simultaneous display is not allowed in different directions of traffic flow, are connected in such a way that in the case of a simultaneous operation of these relays, they actuate a test relay which, thereupon, and in the manner known per se, releases a trouble indication, and permanently switches off at least the respective signals, or replaces them by another unambiguous signal, e.g. a flashing or blinking signal. Accordingly, this arrangement requires that each signal lamp have a relay of its own, whose contacts are then connected in series with those of the others. Especially in the case of large traffic junctions (centers of traffic) this may call for the series connection of a great number of contacts which, due to this chain circuit (e.g. due to contact soilings) may also be the cause of trouble. In addition thereto, it is a difficult task to extend such a traffic junction at will, because for each additional locking of a new road there has to be set up an additional chain circuit of supervisory contacts, in other words, the already existing supervisory relays have to be replaced by ones comprising a greater number of contacts.

The present invention is concerned with the problem of providing an arrangement which has a simple construction and is capable of being modified at any time. According to the invention, this is accomplished by connecting a supervisory relay between every signal lamp or group of signal lamps and every other signal lamp or groups of signal lamps, of which only one lamp or one group of lamps may be lighted at a time. A circuit for the energization of the supervisory relay is completed via one of the control switches for the one signal lamp or group of signal lamps that is to be lighted, and the other signal lamp or group of signal lamps. One contact of this supervisory relay, in cooperation with the control switch, releases a trouble indication of the type known per se.

According to the further embodiment of the invention a high-ohmic relay is used as the supervisory relay, whereby the signal lamp completing the energizing circuit for the supervisory relay is prevented from displaying a light signal.

The invention will now be described in detail with reference to some examples of embodiment including, however, only those details which are absolutely necessary for understanding the invention. Corresponding parts in the different drawings are indicated by the same references. The contacts of a switch or relay which are capable of being operated simultaneously by being mechanically linked together, are indicated by the same small letters and, for the purpose of distinction, are provided wih an attached Arabic numeral. The associated operating element, such as a relay, is designated by the same letter, but is capitalized. Thus, for example, the three control contacts which are operated in common, are indicated by *a*1, *a*2 and *a*3, and the three contacts of a relay V1 are indicated by the references *v*11, *v*12, and *v*13.

Figures 2, 2A, 3, 3A, 3B:
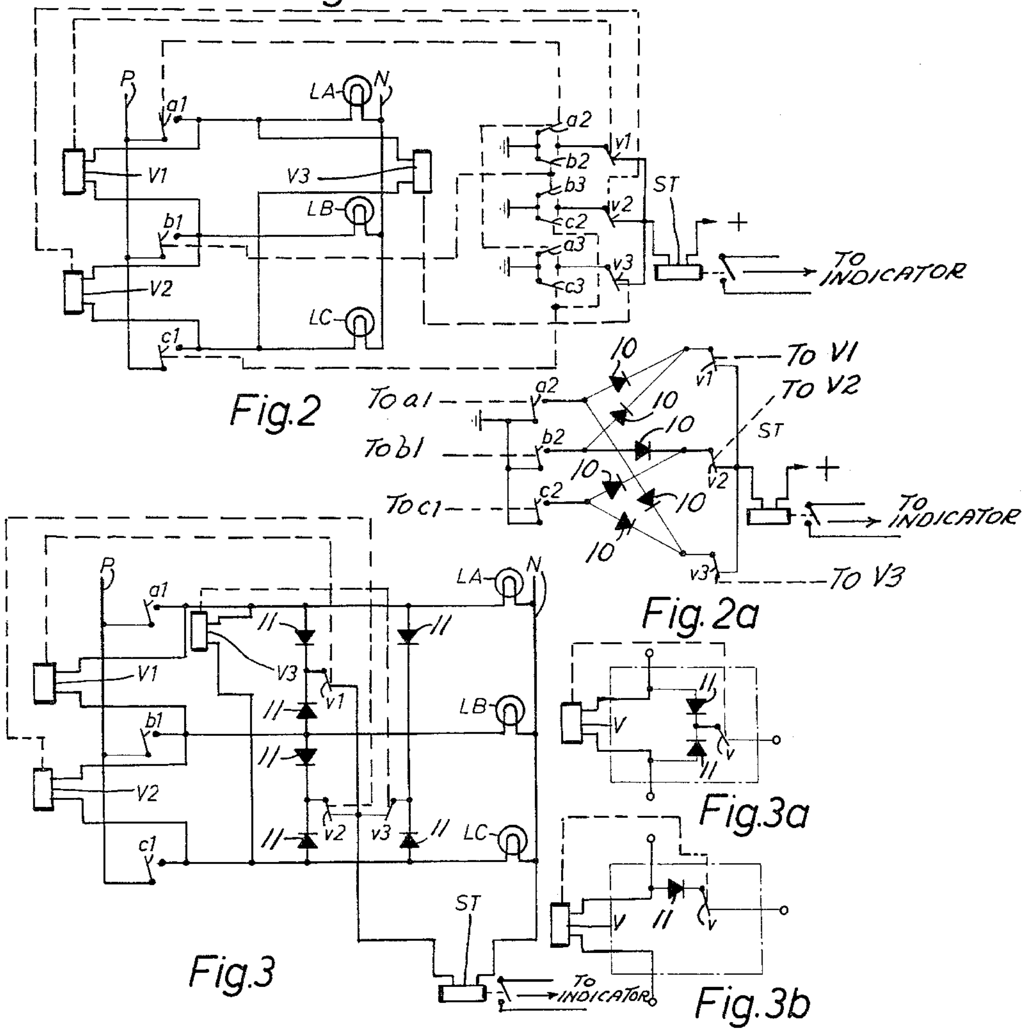
Figure 4:
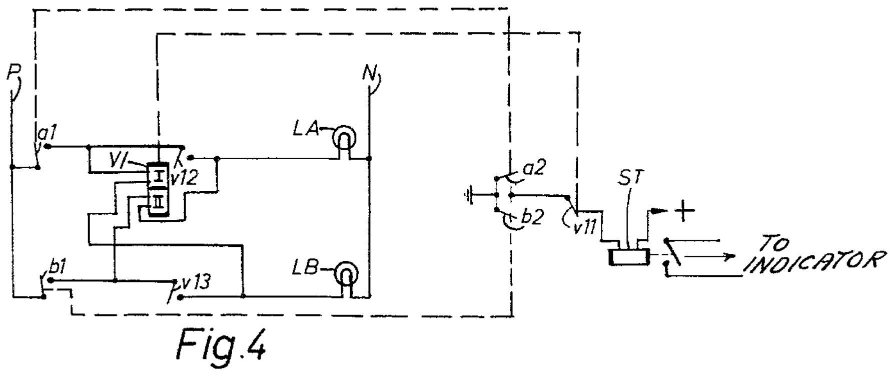
Figure 5:
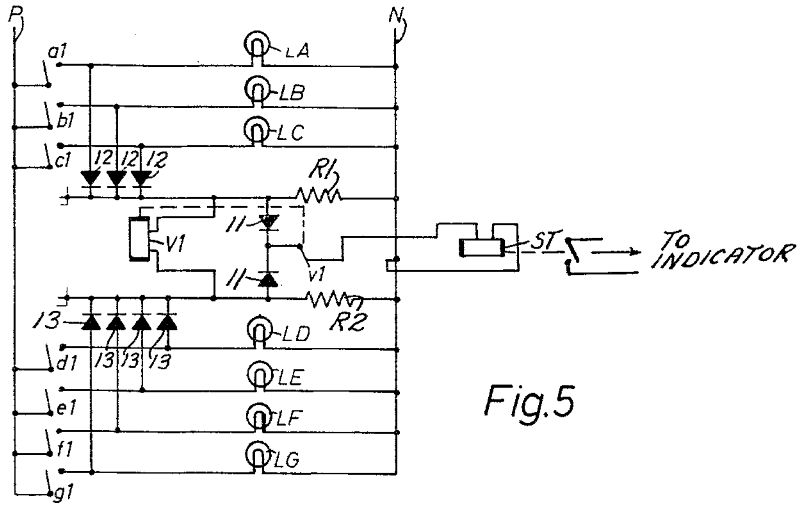
Figure 5A:
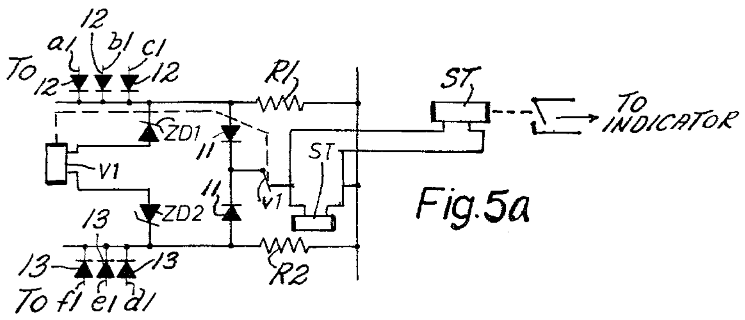

In the accompanying drawings:

FIG. 1 shows a simple type of interlocking circuit and associated trouble-indicating circuit for two signal lamps, FIG. 2 shows an interlocking circuit and associated trouble-indicating circuit for three signal lamps, FIG. 2*a* shows a modification of the trouble-indicating circuit of FIG. 2, FIG. 3 shows an interlocking and trouble-indicating circuit for three signal lamps requiring no additional control-switch contacts, FIG. 3*a* shows a supervisory relay as a structural group, FIG. 3*b* shows a simplified embodiment of the arrangement according to FIG. 3*a*, FIG. 4 shows an arrangement for supervising two lamps, in which the interlocking relay is a differential relay, FIG. 5 shows an interlocking circuit for two signal-lamp groups, and FIG. 5*a* shows a modification of the connection of the supervisory relay according to FIG. 5.

The individual lamps are actuated by a contact of either a control relay or a control switch. The assignment between the control contact and the lamp can be clearly recognized from the use of the same references. Thus, for example, the lamp LA is controlled by the contact *a*1.

Referring to FIG. 1, a schematic diagram of one type of arrangement embodying the present invention is illustrated. Two lamps LA and LB, which may not be lighted at the same time are to be supervised. A supervisory relay V1 is placed between them. In this embodiment the supervisory relay is a very high-resistance relay which, must also be capable of responding to alternating current. The rectifiers which might become necessary in cases where the actuation is effected with the air of A.C., are not shown, because such a connection is known to the person skilled in the art. Contacts *a*1 and *b*1 are contacts of a control switch or a control relay A and B (not shown) respectively. P is a line from a positive source of power, and N is the return line to said source. The trouble-indicating circuit of the arrangement consists of a trouble-indicating relay ST, a contact *v*1, of supervisory relay V1, and contacts *a*2 and *b*2 of switches A and B, respectively.

The signalling system will be activated on the closing of either contact *a*1 or *b*1. Assume contact *a*1 is closed. A circuit for the operation of lamp LA will then be completed, and said lamp will be lighted up. At the same time, contact *a*2 will be closed since, as explained above, contacts *a*1 and *a*2 are contacts of the same switch or relay A, and are opened and closed at the same time. Thus, a circuit for the operation of the trouble-indicating relay will be closed at the same time as that for the operation of lamp LA. The trouble-indicating relay will then be operated, and send the trouble-indicating signal, unless the circuit can be opened by the opening of contact *v1* of relay V1. By the closing of *a1*, however, the relay V1 will be connected to the phase line P, and the circuit for the energization of this relay will be completed via lamp LB and the return conductor N. Due to the high resistance of the relay the lamp LB will be prevented from being lighted. The relay will, therefore, operate and open its back contact *v1*, thus preventing the operation of the trouble-indicating relay. If, however, on account of some kind of trouble, the lamp LB should happen to be lighted at this time position, then, at the lower winding end of the relay V1 there will likewise be applied the potential of the phase line P. In this case, and upon actuation of the control-switch contact *a1*, the relay V1 will be prevented from operating, because the same potential is applied to both sides of the winding. Via the actuated control-switch contact *a2* and the non-actuated back-contact *v1*, the relay ST will now be operated and, in the well-known and therefore not shown manner, release a trouble indication. It is also possible with the aid of this relay to either disconnect the whole system, or to perform a switchover to a flashing light signal.

The same supervisory process is performed whenever the lamp LB is switched on via the control-switch contact *b1*. In this case the supervisory relay V1 completes its circuit via the lamp LA. With the aid of this system it is likewise possible to perform a supervision of the signal circuits with respect to interruptions. For example, if the lamp LB is damaged on account of a wire break (filament break), then the circuit for the relay V1 will be interrupted upon actuation of the control-switch contact *a1*. In this case a trouble indication will likewise be effected in the manner described hereinbefore. Of course, it is also possible to operate the lamps with direct current only. In this case no particular arrangements need be provided for the A.C. operation of the relay.

FIG. 2 represents the situation where three lamps are supervised in order to prevent them from being lighted at the same time. A supervisory relay is arranged between each lamp and one of the other two. In the example shown these are the relays V1, V2 and V3. Upon actuation of the control-switch contact *b1*, for example, the relays V1 and V2 should operate if there is no trouble. These relays serve to prevent trouble indication signaling by the action of their operated back contacts. The non-energization of relay V3 has no effect upon the trouble indication, because the back contact *v3* is not connected in series with a control contact *b*.

FIG. 2*a* is a trouble-indicating circuit, to be used with the interlocking circuit part of FIG. 2.

In order to reduce the expenditure on additional control contacts which, in FIG. 2, amounts to three contacts per control switch, the contacts of the supervisory relays are connected to the control-switch contacts via rectifiers 10.

If contact *a1* is closed, then as explained above, contact *a2* is also closed, and, in the absence of trouble in the circuit, supervisory relays V1 and V3 are energized and their contacts *v1* and *v3* are opened. The rectifiers 10 are necessary in lines connecting the switch contacts with the supervisory relay contacts in order to prevent the activation of the trouble-indicating relay ST via the closed contact of the unactivated supervisory relay, in this case V2.

In this case only two contacts are necessary per control switch. This number of contacts will not be increased if further supervisory arrangements are added for other lamps, whereas the arrangement according to FIG. 2 requires correspondingly more contacts.

In FIG. 3, a still more favourable solution results where the back contacts of the supervisory relays are connected to the control circuits of the lamps directly via rectifiers 11. In this case, there is only one contact per control switch, which, in addition to controlling the lamp, also acts upon the circuit for the trouble-indicating relay ST. Upon closing the control switch *a1*, the lamp LA is lighted. At the same time the relays V1 and V3 are connected to phase-line P and their energizing circuit to conductor N is completed via the lamps LB and LC respectively. The contacts *v1* and *v3* are opened, so that now the trouble-indicating relay ST is prevented from operating. However, if for example the lamp LB should already be lighted upon actuation of the contact *a1*, then the relay V1 will be prevented from operating because the potential of the phase line P will be applied to both ends of the winding. By the circuit including the closed contact *a1*, the rectifier 11, and the non-actuated back contact *v1*, trouble-indicating relay ST will be connected between conductor P and N and, hence, will be actuated to provide the trouble indication. Rectifiers 11 provide a current path for the trouble-indicating relay ST without shorting the supervisory relays. Without rectifiers 11, the trouble indicating relay ST would always be operated. In addition, rectifiers 11 serve to prevent the completion of circuits for the operation of all the lamps except the one that is to be operated by the closing of a particular control switch. In this organization, the ease with which new lamps may be supervised is particularly noticeable. The supervisory relay, which is necessary for supervising two signal lamps, may be assembled to form one unitary structure together with the contact and the rectifiers, as is shown in FIG. 3*a*. In this case, all that is necessary is to connect the two terminals for the relay windings to the corresponding control lines for the lamps, and the third output to the trouble-indicating relay.

If the supervision is merely supposed to prevent a simultaneous inadmissible lighting-up of the lamps LA and LB or LA and LC respectively, and if the simultaneously lighting-up of the lamps LB and LC is supposed to be permitted, then the supervisory relay V2 together with its rectifiers and the contact *v2* may be omitted.

If, as is the case in the case of a road-traffic signalling lamp, several lamps are connected in parallel, for example, each signal lamp on the right- and the left-hand side of the road, then a supervision with respect to a wire break (filament break) of the lamp cannot be carried out, because the supervisory relay can complete its circuit via the second parallel-arranged lamp. If no supervision with respect to a wire break is required, then one rectifier with its respective connecting line may be omitted, as is shown in FIG. 3*b*. Since, in the case of trouble which causes the release of an indication, the potential of the phase line P is applied to both connecting terminals of the relay V, the relay ST connected to the conductor N will be energized via the back contact *v*, irrespective of which of the two lamp circuits is completed by the action of the control switch.

If this unitary structure (constructional group) (FIG. 3*b*) is equipped with a low-resistance relay it is possible to carry out therewith a supervision of the lamps with respect to wire breaks. In this case the relay must be arranged in series with the lamp. Both the mode of operation and the trouble indication bear resemblance to what has already been described hereinbefore.

FIG. 4 shows a differential relay comprising two windings, I and II, used as a supervisory relay, in order to prevent a simultaneous lighting-up of two lamps, even for the shortest period of time. Into the control circuit for the lamps there are then inserted additional contacts *v12* and *v13* of the said supervisory relay V1, which only act to complete the control circuit upon energization of the relay (V1). The two windings I and II of the supervisory relay are connected differentially. In the case of a simultaneous current flow in both windings, therefore, the relay will remain deenergized. The trouble indication is released by the action of contact *v11*, and a lighting-up of the lamps is prevented by the action of the contacts *v12* and *v13*.

An arrangement for controlling groups of lamps is shown in FIG. 5. Here the signal lamps are arranged in such a way that within a first group (LA, LB, LC) one or several lamps may be lighted up simultaneously, but not simultaneously with one or more lamps of the second group (LD, LE, LF, LG), and the lamps of these second groups are respectively capable of being lighted either alone, or several of them simultaneously. The supervisory relay V1 is arranged btween the two groups. The control circuits associated with one group of lamps includes the control-switch contacts (*a*1, *b*1, *c*1, or *d*1, *e*1, *f*1, *g*1) coupled to individual rectifiers (12 or 13 respectively), which in turn are connected in common to one terminal of the supervisory relay. The other terminal of relay V1 is connected by resistor R1 or R2 to the conductor N. This resistor substitutes for the resistance of the lamp used in the case of an individual connection, such as in the previously described embodiments. The rectifiers 12 and 13 couple the first and second groups of control switch contacts and their associated lamps respectively to each terminal of supervisory relay V1 and at the same time allow less than all of the lamps in a group to be lighted. Obviously, in the arrangement of FIG. 5, there can be no supervision with respect to filament breaks. But the supervision to see that a group of lights is not lighting is identical to that described in FIG. 1, except that the resistor R1 or R2 completes the circuit for the supervisory relay in place of lamp LA and lamp LB.

In the case of an irregular connection in the individual groups, for example, where all four of the control contacts *d*1 through *g*1 of the second group are connected, and only one control contact, e.g. *a*1 of the first group is connected, it is possible due to the conditions resulting in the voltage divider composed of the rectifiers and resistors, that such potential will result that the relay V1 will still be traversed by a current which, depending upon the sensitivity of the relay, will cause this relay to operate even though trouble exists. In order to prevent this trouble, the arrangement of FIG. 5*a* is used, wherein two oppositely arranged Zener diodes ZD1 and ZD2 are connected in series with the supervisory relay V1. By properly selecting these Zener diodes, such types of traversal currents are blocked and the relay responds only if none of the lamps is lighted in the other group.

While we have described above the principles of our invention in connection with specific apparatus, it is to be clearly understood that this description is made only by way of example and not as a limitation to the scope of our invention as set forth in the objects thereof and in the accompanying claims.

What is claimed is:

1. An arrangement for supervising alternate signal conditions, especially in road traffic light signalling systems comprising:
- a source of potential;
- at least two networks each including at least two signal lamps having one terminal thereof connected to one terminal of said source of potential;
- control means included in each of said networks to selectively couple the other terminal of said lamps to the other terminal of said source of potential for lighting said lamps;
- a supervisory circuit to determine the operating condition of said lamps in each of said networks including at least one
  - relay coupled between said control means of each of said networks, and
  - first means including means selectively operable by said at least one relay in each of said networks to couple said one and said other terminal of said source of potential; and
- trouble indicating means coupled to each of said control means, said relay being responsive to the activation of more than one of said control means and the ensuing inoperativeness of said relay to produce a trouble indicating output and the activation of only one of said control means energizing said relay to produce a trouble free indicating output.

2. An arrangement according to claim 1, wherein said first means includes said lamps.

3. An arrangement according to claim 1, wherein said first means includes a resistor in shunt relation to said lamps.

4. An arrangement according to claim 1, wherein said relay is a high ohmic relay.

5. An arrangement according to claim 1, wherein said relay is a differential relay.

6. An arrangement according to claim 5, wherein
each of said control means includes
- a first switch disposed in one of said networks, and
- at least a second switch ganged to said first switch; and said differential relay includes
- a first winding having one terminal coupled to said first switch of one of said networks and the other terminal coupled to said other terminal of said lamp in the other of said networks,
- a second winding having one terminal coupled to said first switch of said other of said networks and the other terminal coupled to said other terminal of said lamp in said one of said networks,
- a first contact operatively coupled to said trouble indicating means and said second switch,
- a second contact coupled between said one terminal of said first winding and said other terminal of said second winding, and
- a third contact coupled between said one terminal of said second winding and said other terminal of said first winding.

7. An arrangement according to claim 1, wherein
said relay includes
- a contact operatively coupled to said trouble indicating means; and each of said control means includes
- a first switch disposed in said networks, and
- at least a second switch ganged to said first switch operatively coupled to said contact.

8. An arrangement according to claim 7 wherein
a rectifier is coupled between each of said second switches and said contact.

9. An arrangement according to claim 1, wherein
said relay includes
- a contact operatively coupled to said trouble indicating means;

each of said control means includes
- a switch disposed in said networks; and said trouble indicating means is coupled to each of said switches by a series circuit including at least a rectifier and said contact.

10. An arrangement according to claim 1, wherein
said networks are three in number;
said supervisory circuit includes three relays each coupled between said control means of a different pair of said networks; and
said trouble indicating means is coupled to each of said control means and each of said relays.

11. An arrangement according to claim 1, wherein
each of said relays includes
- a contact operatively coupled to said trouble indicating means; and each of said control means includes
- a first switch disposed in said networks,
- a given number of other switches ganged to said first switch, and predetermined pairs of other switches being operatively coupled to each of said contacts.

12. An arrangement according to claim 11, wherein a rectifier is coupled between said other switch and each of said contacts.

13. An arrangement according to claim 10, wherein each of said relays includes
a contact operatively coupled to said trouble indicating means;
each of said control means includes
a switch disposed in said networks; and
said trouble indicating means being coupled to each of said switches by two series circuits coupled in shunt relation, each of said series circuits including a rectifier and one of said contacts.

14. An arrangement according to claim 1, wherein each of said networks include a plurality of said lamps coupled in shunt relation.

15. An arrangement according to claim 1, wherein each of said networks include
a plurality of circuits including said lamps and said control means, and
a resistor coupled in shunt relation to said plurality of circuits; and
said supervisory circuit includes
said relay coupled to each of said resistors, and
means included in each of said networks coupling said resistor to each of said control means.

16. An arrangement according to claim 15, wherein said trouble indicating means is coupled to said control means by a circuit including
a pair of rectifiers coupled back to back disposed in parallel relation to said relay, and
a contact of said relay coupled to the junction of said rectifier.

17. An arrangement according to claim 15, wherein said means included in each of said networks includes
a plurality of rectifiers each coupled to one of said control means.

18. An arrangement according to claim 17, wherein a zener diode couples said relay to each of said resistors.

19. An arrangement according to claim 18, wherein said trouble indicating means is coupled to said control means by a circuit including
a pair of rectifiers coupled back to back disposed in parallel relation to said relay and said zener diodes, and
a contact of said relay coupled to the junction of said rectifiers.

20. An arrangement for supervising alternate signal conditions, especially in road traffic light signalling systems comprising:
a source of potential;
more than two networks each including at least one signal lamp having one terminal thereof connected to one terminal of said source of potential;
control means included in each of said networks to selectively couple the other terminal of said lamps to the other terminal of said source of potential for lighting said lamps;
a supervisory circuit to determine the operating condition of said lamps in each of said networks including at least
a first circuit disposed in one of said networks having first means coupled to said one terminal of said source of potential and a second means coupled to said control means of said one of said networks,
a second circuit disposed in the other of said networks having third means coupled to said one terminal of said source of potential and a fourth means coupled to said control means of said other of said networks, and
a relay coupled between the junction of said first and second means and the junction of said third and fourth means; and
means coupled to each of said control means, said relay being responsive to the activation of two of said control means and the resultant inoperativeness of said relay to produce a trouble indicating output and the activation of one of said control means and the activation of said relay to produce a trouble free indicating output.

References Cited by the Examiner

UNITED STATES PATENTS

| | | | |
|---|---|---|---|
| 2,122,112 | 6/1938 | Powell | 340—348 |
| 2,636,133 | 4/1953 | Hussey | 340—147 |
| 2,706,222 | 4/1955 | Bjornson | 179—18.3 |
| 2,935,627 | 5/1960 | Schneider | 340—147 |
| 2,939,121 | 5/1960 | Saykay | 340—176 |
| 3,015,088 | 12/1961 | Bower | 340—147 |

NEIL C. READ, *Primary Examiner.*

BENNETT G. MILLER, *Examiner.*